(12) United States Patent
Kobayashi

(10) Patent No.: US 6,621,640 B2
(45) Date of Patent: Sep. 16, 2003

(54) PROJECTION DISPLAY APPARATUS

(75) Inventor: Shuichi Kobayashi, Kanagawa (JP)

(73) Assignee: Canon Kabushiki Kaisha (JP)

( * ) Notice: Subject to any disclaimer, the term of this patent is extended or adjusted under 35 U.S.C. 154(b) by 52 days.

(21) Appl. No.: 09/825,021

(22) Filed: Apr. 3, 2001

(65) Prior Publication Data

US 2002/0001066 A1 Jan. 3, 2002

(30) Foreign Application Priority Data

Apr. 4, 2000 (JP) ........................................ 2000-102557

(51) Int. Cl.⁷ ................................................ G02B 3/00
(52) U.S. Cl. ...................................... 359/649; 359/569
(58) Field of Search .............................. 359/649–651, 359/558, 566, 569, 573, 738–740; 349/5–9

(56) References Cited

U.S. PATENT DOCUMENTS

| | | | |
|---|---|---|---|
| 5,071,207 A | 12/1991 | Ceglio et al. .................. | 359/15 |
| 5,760,850 A | 6/1998 | Nakanishi et al. ............. | 349/5 |
| 5,798,864 A | * 8/1998 | Sekiguchi .................... | 359/559 |
| 5,923,479 A | 7/1999 | Nagata ....................... | 359/740 |
| 5,969,832 A | * 10/1999 | Nakanishi .................... | 359/15 |
| 5,978,158 A | 11/1999 | Nagata ....................... | 359/753 |

FOREIGN PATENT DOCUMENTS

| | | |
|---|---|---|
| JP | 08-220482 | 8/1996 |
| JP | 10-11577 | 5/1998 |
| JP | 10-133149 | 5/1998 |
| JP | 11-064726 | 3/1999 |

OTHER PUBLICATIONS

SPIE vol. 1354 International Lens Conference (1990), pp. 297–309, A.D. Kathman and S.K. Pitalo "Binary optics in lens design".
SPIE vol. 1354 International Lens Conference (1990), pp. 316–322, A. P. Wood. Using hybrid refractive–diffractive elements in infrared Petzvel objectives:.

* cited by examiner

Primary Examiner—Jordan M. Schwartz
(74) Attorney, Agent, or Firm—Morgan & Finnegan, LLP

(57) ABSTRACT

This invention can provide an optical system which has a diffractive optical element that can suppress generation of flare or the like due to light rays of unnecessary orders of diffraction caused by the wavelength dependence of the diffractive optical element without using any complicated arrangement. In an optical system, light from a light source is separated into light rays of predetermined wavelength regions by a color separation optical system. Those light rays are incident on pixels of an image display element having a plurality of pixels in correspondence with the predetermined wavelength regions. An image displayed on the image display element is projected in an enlarged scale by a projection optical system. A diffractive optical element is disposed near the pupil of the projection optical system, and the diffraction efficiency of the diffractive optical element can be optimized in each of predetermined wavelength regions.

8 Claims, 9 Drawing Sheets

PROJECTION OPTICAL SYSTEM
(SCREEN)

PROJECTION DISPLAY APPARATUS

BACKGROUND OF THE INVENTION

1. Field of the Invention

The present invention relates to an optical system having a diffractive optical element used in a broad wavelength region such as a visible light region and, more particularly, to an optical system for projecting and displaying an image on an image display element and a projection optical apparatus using the same.

2. Related Background Art

In recent years, in order to achieve video display with presence or effective presentation, a large-scale, high-resolution screen display apparatus is demanded, and an optical system of a projection type image display apparatus is required to have still higher performance. The projection type image display apparatus includes a so-called three-plate type apparatus which uses three image display elements such as liquid crystal panels in correspondence with the red, blue, and green wavelength regions, and a so-called single-plate apparatus which displays a color image using a single image display element.

The single-plate apparatus has a simpler arrangement than the three-plate apparatus, and can attain size and weight reductions. The optical system of the single-plate apparatus includes an optical system in which color filters corresponding to light rays of the red, blue, and green wavelength regions on pixels of a single image display element such as a liquid crystal panel or the like are provided, and an optical system in which light rays having different wavelength regions such as red, blue, and green are caused to be incident on predetermined pixels on an image display element with different angles of incidence with one another.

When color filters are used, since each pixel transmits only the wavelength of a specific wavelength region, and absorbs other wavelengths, the incident light suffers a large loss, and it is difficult to realize a bright projection type display apparatus.

An outline of the arrangement in which light rays having different wavelength regions such as red, blue, and green are caused to be incident on respective pixels on an image display element with different angles of incidence with one another will be explained below.

Figure 1A:
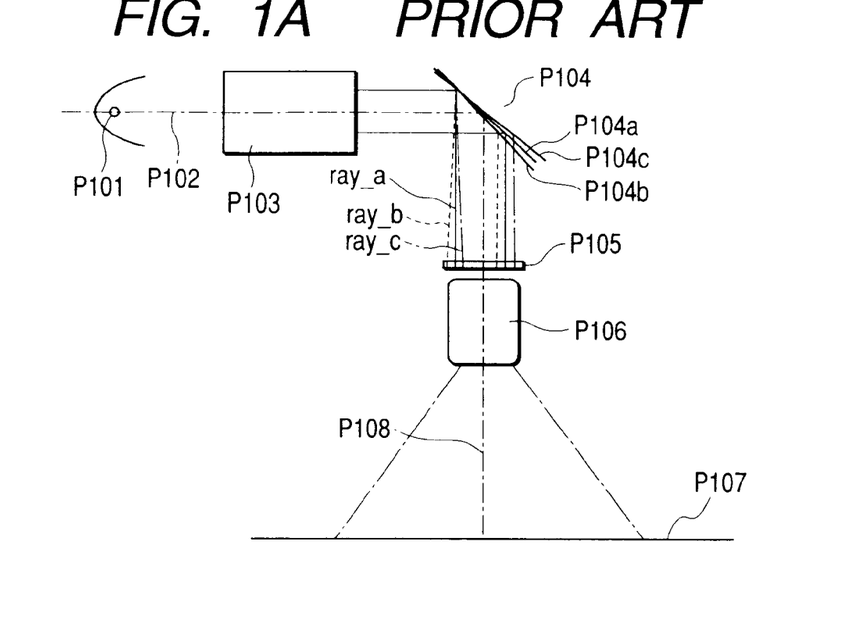
FIG. 1A is a schematic view of a conventional single-plate type projection optical system which does not use any color filters.
Figure 1B:
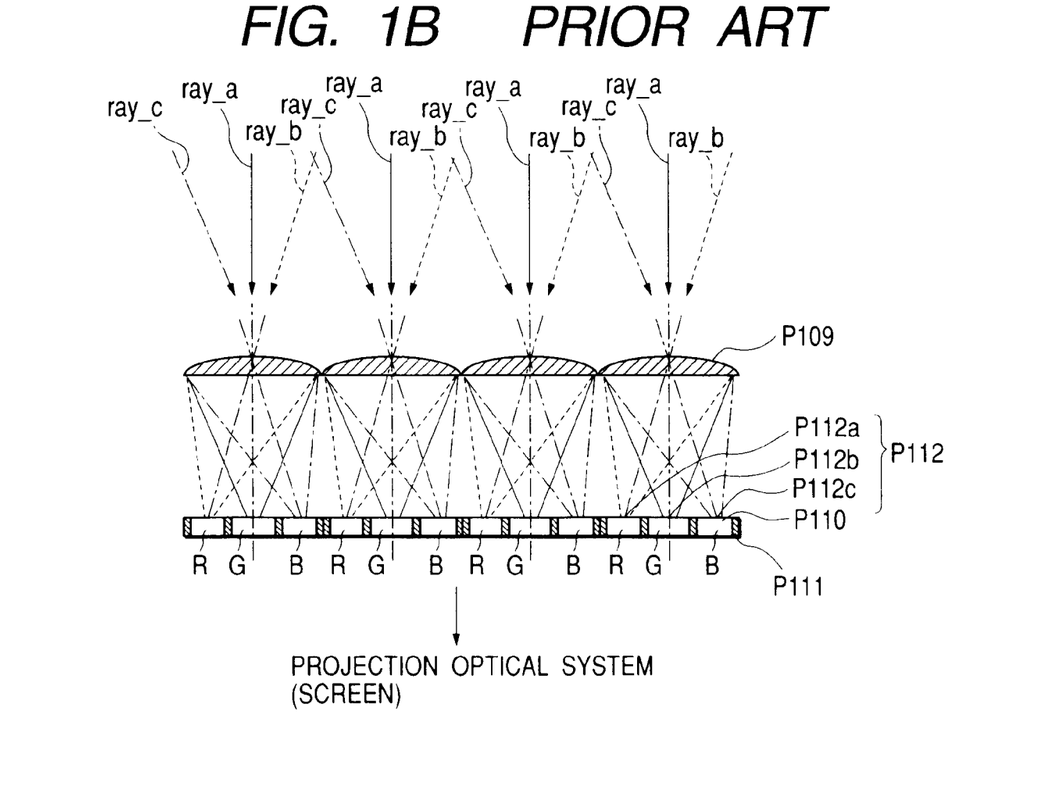
FIG. 1B is a schematic view of a portion around an image display element in the projection optical system.

FIGS. 1A and 1B show an outline of the arrangement of the aforementioned apparatus. A light source P101 emits white light. Light emitted by the light source is uniformed by an illumination light intensity distribution uniforming means P103, which is set on an optical axis P102, and emerges from the means P103 as a nearly collimated light beam. An optical unit P103 includes a so-called optical integrator.

A color separation means P104 comprises dichroic mirrors P104a, P104b, and P104c each having wavelength selectivity, and the light from the light source is deflected by the color separation means.

In the color separation means P104, the dichroic mirrors are arranged to make different angles with one another, so that an image display element P105 is illuminated with rays with wavelengths selected by the dichroic mirrors with different angles. The image display element P105 comprises, e.g., a transmission type liquid crystal element. Light rays transmitted through the image display element form images of the image display element P105 on a screen P107.

As described above, light rays ray_a, ray_b, and ray_c of the wavelength regions selected by the dichroic mirrors of the color separation optical system P104 illuminate the image display element P105 at given angles. The light rays ray_a, ray_b, and ray_c correspond to, e.g., those of the green, red, and blue visible light regions.

An array-like focusing means such as a microlens array P109 is formed on the image display element P105, and focuses the respective color light rays at different positions. An image display portion P110 of the image display element P105 has pixels P112, the amounts of light transmitted therethrough can be controlled by a control means (not shown) that controls the image display element P105, and pixels P112a, P112b, and P112c are arranged in correspondence with the focusing positions of the microlenses P109.

A projection optical system P106 projects those pixels P112 onto the screen.

With this arrangement, a projection optical system that can assure higher use efficiency of light than the system using the color filters can be realized. In such optical system, an optical system that projects an image is required to have higher performance to attain still higher resolution of the image on the screen. Since the solid angle of light from the liquid crystal panel increases due to use of the microlenses, a brighter projection lens is demanded.

A technique that improves optical performance using a diffractive optical element to meet such performance improvement requirements is disclosed in papers such as SPIE vol. 1354 International Lens Design Conference (1990), Japanese Patent Application Laid-Open Nos. 10-115777, 11-064726, and the like. These techniques exploit a physical phenomenon: chromatic aberrations with respect to light rays of a given reference wavelength appear in opposite ways on refraction and diffraction surfaces in the optical system. That is, this means that the diffractive optical element has negative dispersion (Abbe number vd=−3.453) while typical optical glass has positive dispersion. Also, the diffractive optical element has strong anomalous dispersion (Θg, F=0.2956).

In addition, since an aspherical lens effect can be utilized by changing the periodic structure of gratings of the diffractive optical element, a great improvement of optical performance can be expected. Furthermore, since such characteristics of the diffractive optical element are obtainable by a microscopic shape, the space factor is very low, and weight and size reductions can be easily achieved. Exploiting such characteristics of the diffractive optical element disclosed by Japanese Patent Application Laid-Open Nos. 10-115777 and 11-064726, an improvement of performance and a size reduction of the optical system are attained.

As described above, when the diffractive optical element is used, effective features that cannot be realized by a refractive optical system alone can be provided. But since the diffraction efficiency of the diffractive optical element largely depends on the wavelength and angle of incidence, the diffraction efficiency of the element must be sufficiently taken into consideration.

Figure 2:
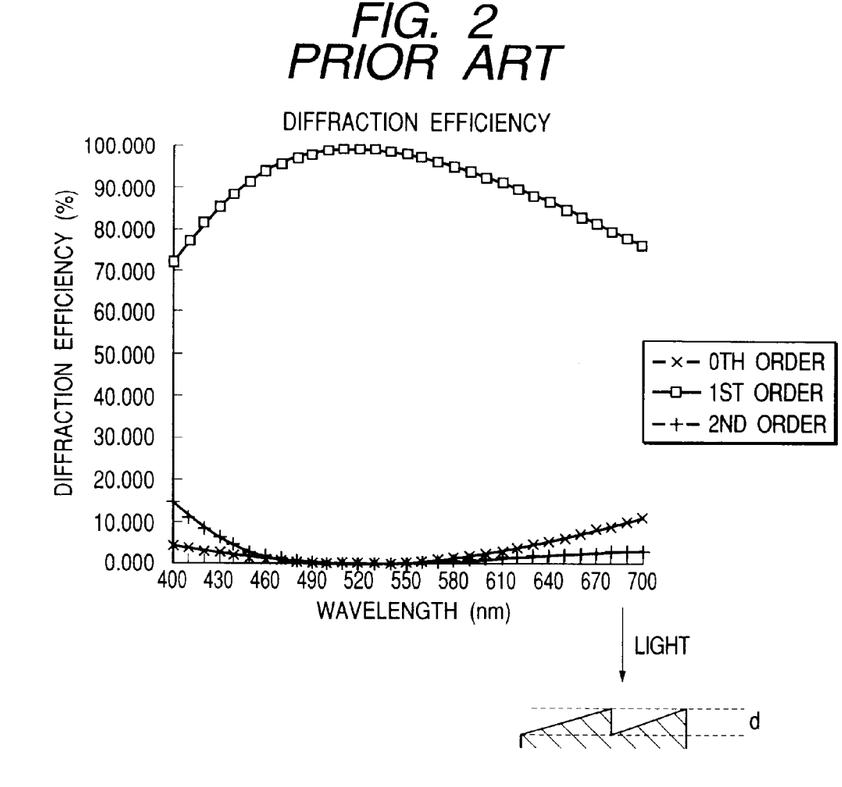
FIG. 2 is a graph showing the diffraction efficiency of the conventional diffractive optical element.

FIG. 2 shows an example of the diffraction efficiency of a single-layered diffractive optical element formed of a given material. As can be seen from FIG. 2, the first-order diffraction efficiency at a specific wavelength (design wavelength) around 520 nm is high, but the diffraction efficiency of a wavelength separate from the design wavelength drops considerably. In the wavelength region that suffers such diffraction efficiency drop, diffraction efficiencies other than the design order such as the 0th order, second order, and the like increase, and cause image deterioration such as flare or the like.

In consideration of such diffraction efficiency characteristics of the diffractive optical element, an arrangement that reduces flare resulting from light rays of unnecessary orders is disclosed in Japanese Patent Application Laid-Open No. 08-220482.

Figure 3:
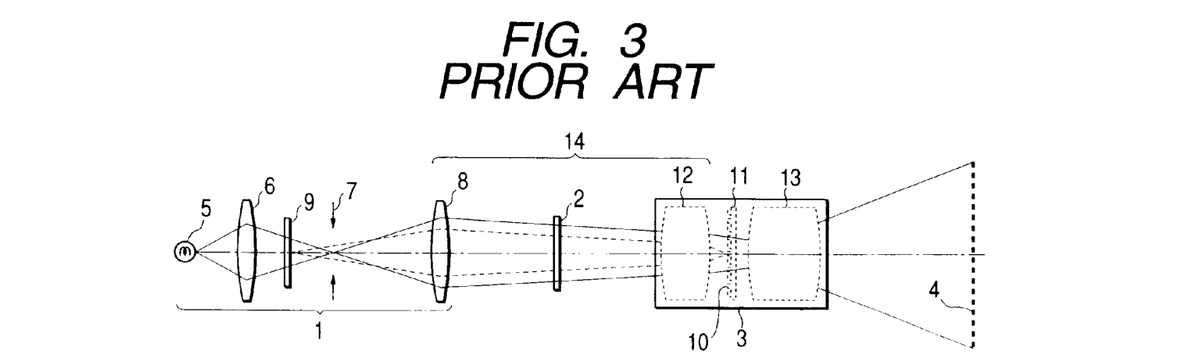
FIG. 3 is a schematic view of a conventional optical system (Japanese Patent Application Laid-Open No. 8-220482)

FIG. 3 shows an outline of Japanese Patent Application Laid-Open No. 08-220482. The arrangement shown in FIG. 3 has an imaging lens system 3 including a relief diffractive optical element, and an illumination optical system 1. A diffractive optical element 11 has an effect of a single lens as a whole, while its relief pattern surface 10 is divided into a plurality of regions with different groove depths, which can maximize diffraction efficiencies with respect to a plurality of light rays of different wavelengths. The illumination optical system 1 comprises a wavelength selection element 9 (e.g., a band-pass filter) having a plurality of transmission regions, which respectively have, as center wavelengths of transmission, wavelengths that maximize the diffraction efficiencies of the divided regions, in correspondence with the divided regions of the relief pattern surface 10. The relief pattern surface 10 and wavelength selection element 9 are so disposed as to be nearly paraxially conjugate with respect to a lens system located therebetween.

Although such arrangement can reduce generation of unnecessary diffracted light rays, a light loss occurs since the wavelength selection element such as a band-pass filter or the like is used.

It is, therefore, an object of the present invention to provide an optical system having a diffractive optical element, which can solve the aforementioned problems, and can suppress generation of flare and the like due to light rays of unnecessary orders of diffraction caused by the wavelength dependence of the diffractive optical element.

SUMMARY OF THE INVENTION

The present invention provides an optical system having a diffractive optical element arranged as in (1) to (9) below:

(1) An optical system in which light from a light source is separated into light rays having predetermined wavelength regions by a color separation optical system, the light rays are caused to be incident on pixels in an image display element having a plurality of pixels, which correspond to the predetermined wavelength regions, and an image displayed on the image display element is projected in an enlarged scale by a projection optical system, characterized in that a diffractive optical element is provided near a pupil of the projection optical system, and diffraction efficiency of the diffractive optical element can be optimized in each of predetermined wavelength regions.

(2) An optical system set forth in the above (1), characterized in that the light rays separated by the color separation optical system into the predetermined wavelength regions are caused to be incident on light focusing means provided in an optical path of the image display element at the light source side at different angles of incidence with one another, and are focused on each of the plurality of pixels of the image display element.

(3) An optical system set forth in the above (1) or (2), characterized in that the diffractive optical element is constructed to have a grating which has different heights in each of the predetermined wavelength regions in correspondence with the predetermined wavelength regions.

(4) An optical system set forth in the above (1) or (2), characterized in that the diffractive optical element is constructed to have a grating height of which changes continuously across the predetermined wavelength regions in correspondence with the predetermined wavelength regions.

(5) An optical system set forth in the above (1) or (2), characterized in that the diffractive optical element is formed of materials having different refractive indices in each of the predetermined wavelength regions in correspondence with the predetermined wavelength regions.

(6) An optical system set forth in the above (1) or (2), characterized in that the diffractive optical element is formed by combining the arrangement set forth in the above (3) concerning the different heights of the grating of the diffractive optical element, and the arrangement set forth in the above (4) concerning the height changing, in correspondence with the predetermined wavelength regions.

(7) An optical system set forth in the above (1) or (2), characterized in that the diffractive optical element is formed by combining the arrangement set forth in the above (3) concerning the different grating height or (4) concerning change in the grating height, and the arrangement set forth in the above (5) concerning employing the materials having different refractive indices, in correspondence with the predetermined wavelength regions.

(8) An optical system set forth in any one of the above (1) to (7), characterized in that the diffractive optical element has region where diffraction efficiencies can be optimized for at least two wavelength regions.

(9) An optical system set forth in the above (8), characterized in that wavelengths of the wavelength regions are those in visible light region.

(10) An optical system set forth in the above (9), characterized in that if $\lambda 1$ and $\lambda 2$ represent the optimized maximum and minimum ones of each wavelength region, a difference between $\lambda 1$ and $\lambda 2$ is not less than 50 nm.

DETAILED DESCRIPTION OF THE PREFERRED EMBODIMENTS

In an embodiment of the present invention that adopts the aforementioned arrangement, i.e., in an optical system which has a light source, an illumination optical system which has a collimate optical system for nearly collimating and uniforming light emitted by the light source, a color separation optical system for separating the collimated light into light rays of predetermined wavelength regions, and illuminating an image display element having a plurality of pixels, and a projection optical system for projecting an image displayed on the image display element in an enlarged scale, light focusing means are provided in each of the plurality of pixels of the image display element in an optical path of the image display element on at least the light source side, a diffractive optical element is located near a pupil of the projection optical system, and diffraction efficiencies of the diffractive optical element are optimized in each of the predetermined wavelength regions. Hence, various aberrations of the optical system can be corrected, the diffractive optical element can be used in a broader wavelength region, and the diffraction efficiency characteristics of the diffractive optical element through which respective color light rays separated by the color separation optical system are transmitted can be optimized.

The light rays separated by the color separation optical system into predetermined wavelength regions are caused to be incident on the light focusing means provided in the optical path of the image display element at the light source side at different angles of incidence with one another, and are focused on each of the plurality of pixels of the image display element, so that color light rays separated by the color separation optical system are able to be incident on pixels of the corresponding colors.

The diffractive optical element can optimize diffraction efficiencies for at least two visible light regions, and when λ1 and λ2 represent maximum and minimum ones of the wavelengths of those two visible wavelength regions, the difference between λ1 and λ2 is 50 nm or more. Hence, the diffraction efficiencies in each of wavelength regions can be optimized more effectively, and a high-quality image can be obtained in the visible light regions.

Preferred embodiments of the present invention will be described hereinafter. (Note that a single-plate type projection image display apparatus will be mainly explained in the following embodiments, but the present invention is not limited by those embodiments.)

(First Embodiment)

Figure 4A:
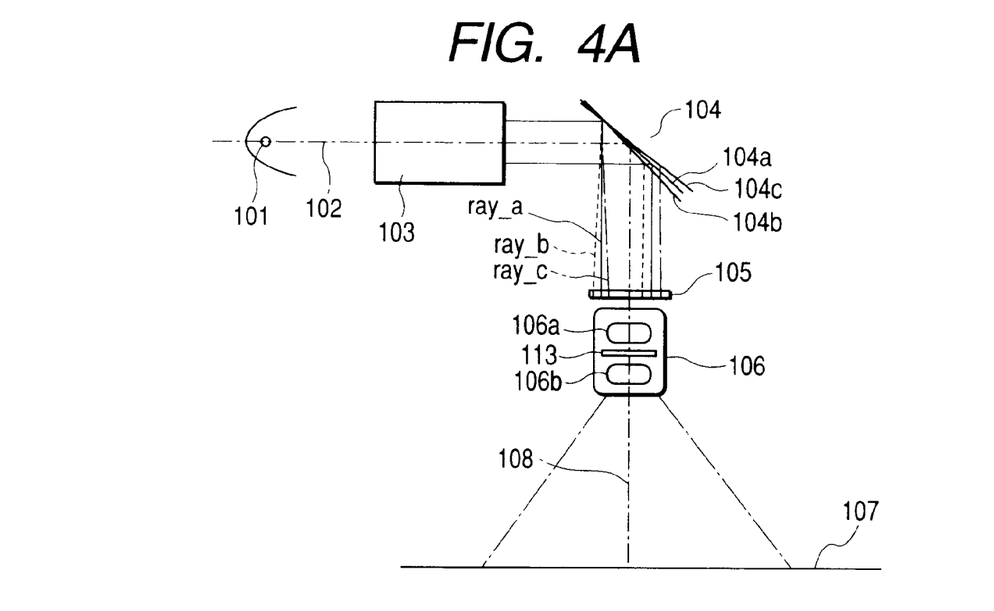
FIG. 4A is a schematic view of an optical system according to the first embodiment of the present invention.
Figure 4B:
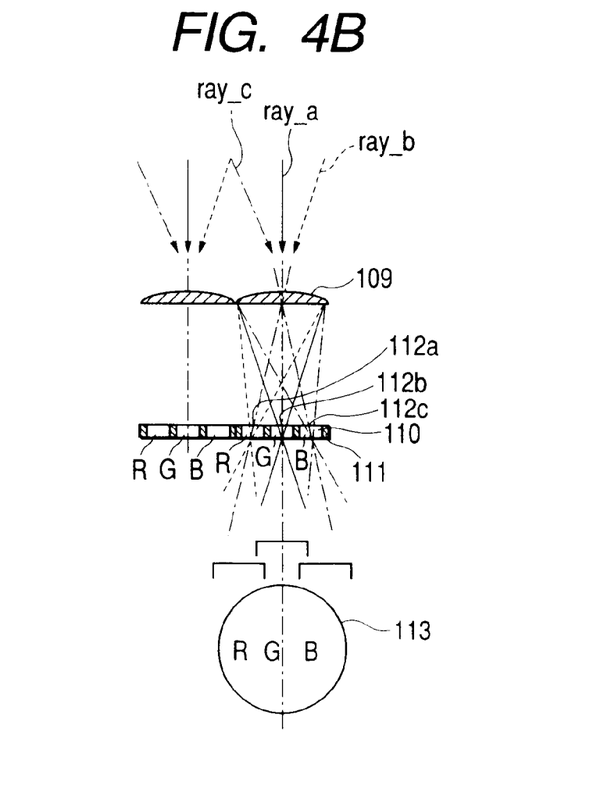
FIG. 4B shows the pupil of an image display element projection optical system in the optical system shown in FIG. 4A and a schematic view of a portion around an image display element.

FIGS. 4A and 4B show the first embodiment of the present invention. FIGS. 4A and 4B show an arrangement in which a diffractive optical element 113 is located near an aperture stop in the optical system in FIGS. 1A and 1B. Hence, the same reference numerals in FIGS. 4A and 4B denote the same functions in FIGS. 1A and 1B, and a description thereof will be omitted.

FIG. 4A shows principal part of the arrangement of this embodiment. As shown in FIG. 4A, light from a light source 101 is collimated via a light uniforming means 103, and illuminates an image display means 105 via a color separation optical system 104. At this time, since the color separation optical system is designed so that light rays of the respective wavelength regions illuminate the image display means 105 with mutually different angles of incidence thereon, these light rays are respectively incident on pixels 112 corresponding to the respective wavelength regions. A projection optical system 106 projects an image displayed on the image display means 105 on a screen 107 in an enlarged scale. A diffractive optical element 113 is disposed near an aperture stop (not shown) of the optical system 106.

FIG. 4B schematically shows the relationship between the distribution of color light rays on the diffractive optical element 113 disposed near the aperture stop, and light rays which are incident on the pixels 112. Assuming that ray__a, ray__b, and ray__c respectively correspond to green (G), red (R), and blue (B), color light rays are distributed at different locations on the diffractive optical element 113 in correspondence with the individual wavelength regions, as shown in FIG. 4B.

As described in the prior art (FIG. 2), light of a given wavelength region has high diffraction efficiency, but required (first order in this case) diffraction efficiency drops at wavelengths other than that given wavelength, and flare or the like is produced due to increase in light rays of other orders. Especially, the diffraction efficiencies of light rays drop largely in a region on the shorter wavelength side than the wavelength (design wavelength) corresponding to the highest diffraction efficiency. If d represents the thickness (height) of the grating portion and $N(\lambda)$ the refractive index at a wavelength λ of a material in the diffractive optical element shown in FIG. 2, a phase difference φ in the air is given by:

$$\phi = 2\pi/\lambda \times d \times (N(\lambda)-1)$$

In case of mth-order light, the diffraction efficiency becomes high when $\phi = m \times 2\pi$. For example, in case of first-order light, the first-order diffraction efficiency becomes high when:

$$\lambda = d(N(\lambda)-1)$$

and the value d is determined from this equation. If the wavelength falls outside this equation, the interference effect of diffracted light rays becomes small, and the diffraction efficiency drops.

Figure 5A:
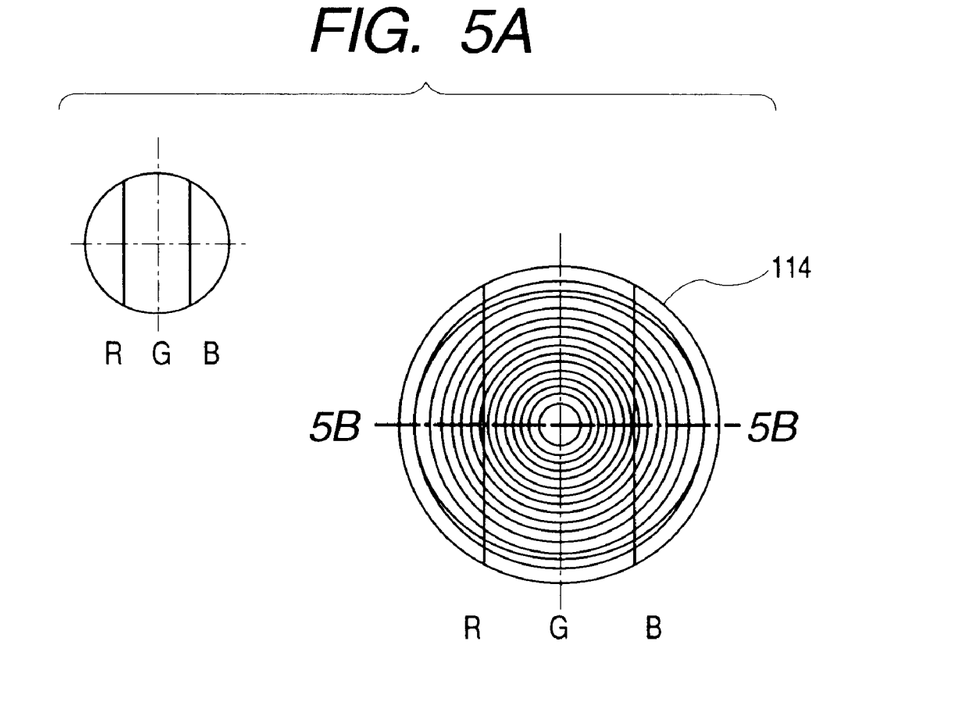
FIGS. 5A and 5B are schematic views of a diffractive optical element in the first embodiment of the present invention.
Figure 5B:
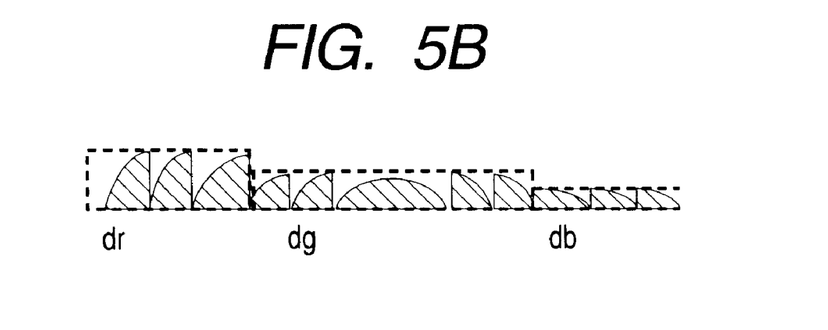

FIGS. 5A and 5B schematically show the arrangement of the diffractive optical element of this embodiment. FIGS. 5A and 5B show the diffractive optical element 113 shown in FIG. 4B in more detail. As shown in FIG. 5A, a diffraction surface 114 having ring-shaped gratings is formed on the diffractive optical element 113. FIG. 5B schematically shows a crosssection of the surface 114, and the diffractive optical element has different heights in correspondence with the G, R, and B portions shown in FIG. 4B. Heights dr, dg, and db corresponding to the R, G, and B portions are respectively 1.25, 1.05, and 0.86 μm, and the material of the gratings is a resin material having a refractive index Nd=1.49 with respect to the d-line, and Abbe number νd=57.4. Note that this diffractive optical element is formed on, e.g., a flat glass substrate by a known manufacturing method such as a replica method or the like.

Figure 6:
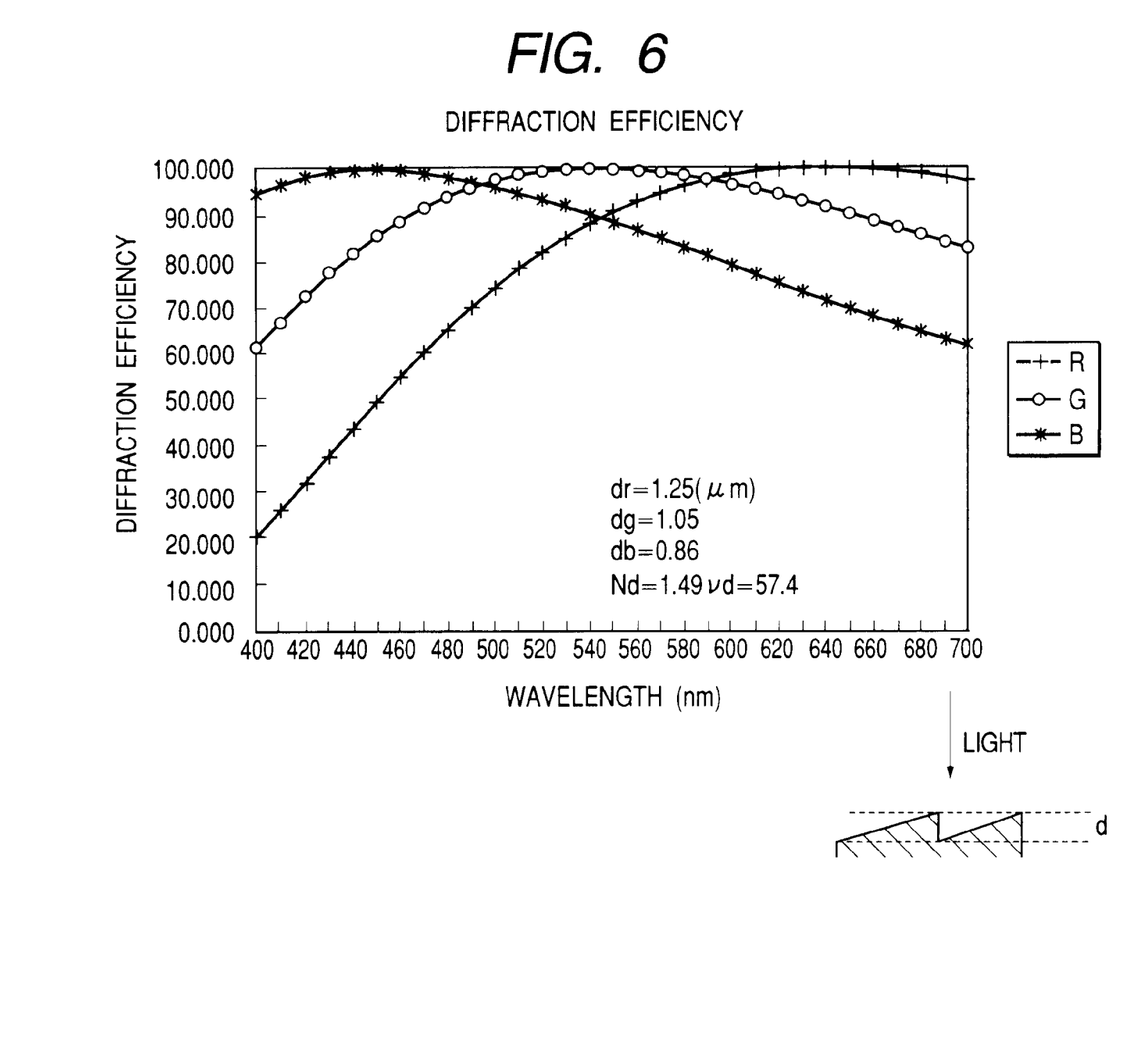
FIG. 6 is a graph showing diffraction efficiencies in units of regions of the diffractive optical element in the first embodiment of the present invention.

FIG. 6 shows diffraction efficiencies at an angle of incidence=0° in correspondence with the respective regions. As can be seen from FIG. 6, the wavelengths that can maximize the diffraction efficiency in the respective regions are around 420 to 480 nm (blue), 520 to 580 nm (green), and 620 to 680 nm (red). These values are set to locate at substantially the centers of the wavelength regions of three color light rays, i.e., blue, green, and red color light rays produced by the color separation optical system 104. In this manner, since the diffraction efficiencies of the diffractive optical element are appropriately set in units of wavelength regions, generation of flare can be greatly reduced.

Figure 7:
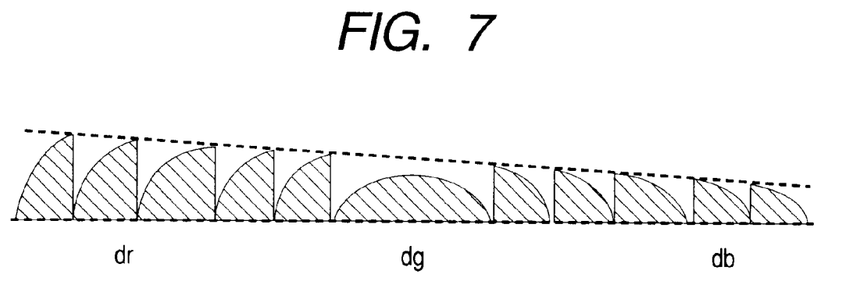
FIG. 7 is a view showing another aspect of the diffractive optical element in the first embodiment of the present invention.

In this embodiment, the diffractive optical element disposed near the aperture stop is divided into three regions, and the diffraction efficiencies of these regions are set in correspondence with the wavelength regions of light rays which are transmitted through those regions. In place of completely dividing regions in this way, the heights of gratings may be changed continuously, as shown in FIG. 7. Also, such change in height may be combined with region division.

Figure 8:
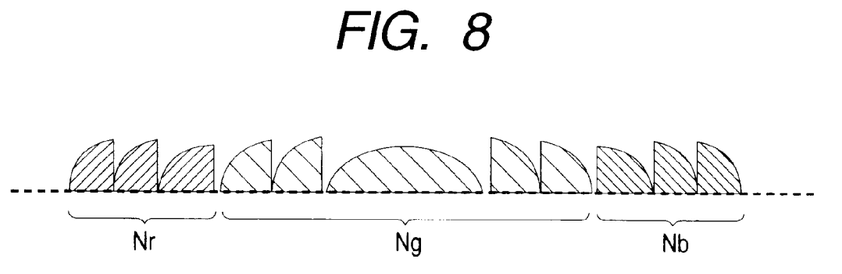
FIG. 8 is a view showing still another aspect of the diffractive optical element in the first embodiment of the present invention.

Diffraction efficiencies are set in correspondence with the heights of gratings. Alternatively, different materials may be used in units of regions, i.e., materials having different refractive indices Nr, Ng, and Nb corresponding to R, G, and B may be used, as shown in FIG. 8, and the diffraction efficiencies may be set in correspondence with these materials with different refractive indices, thus obtaining the same effect. Furthermore, the combination of different materials may be combined with different heights.

Figures 9A, 9B, 9C:
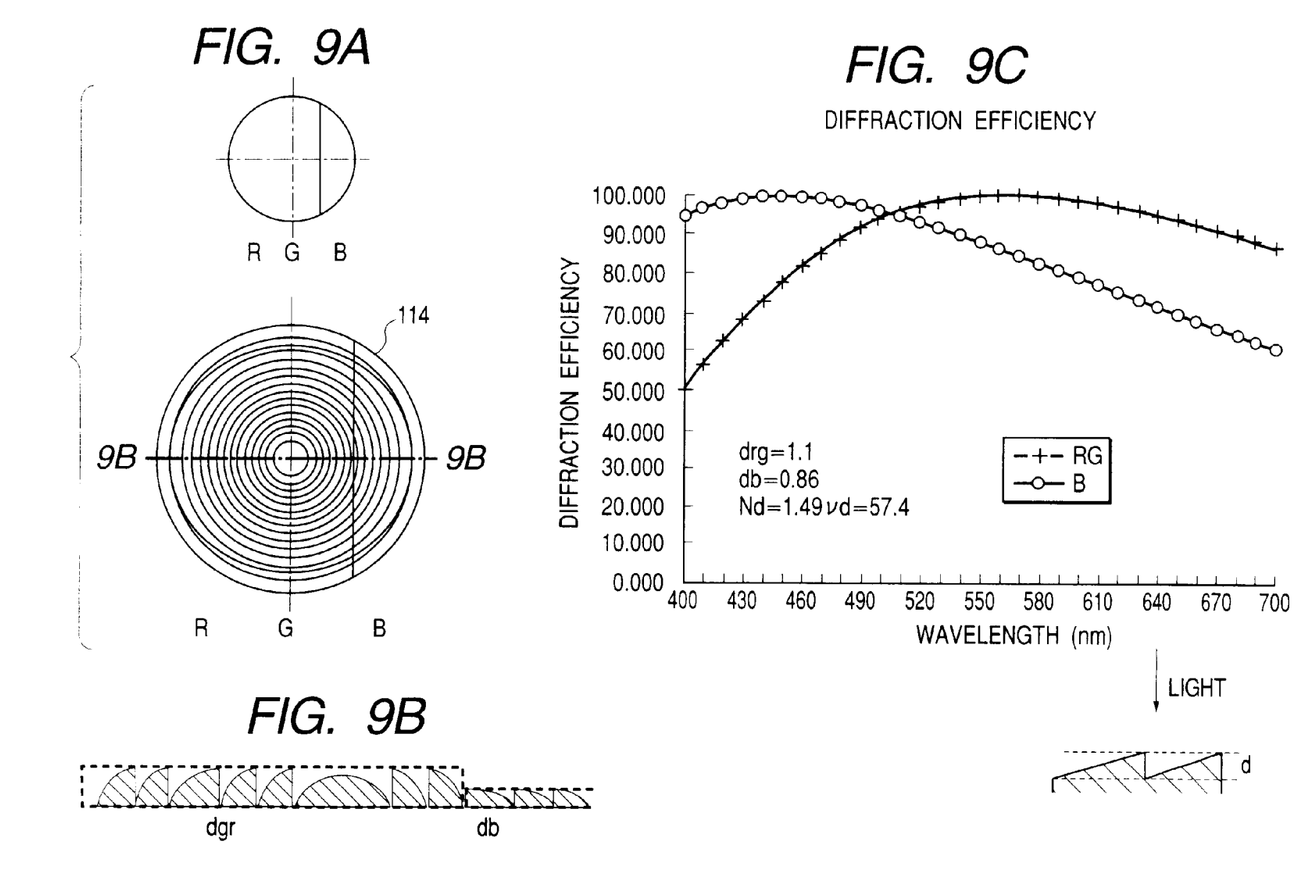
FIGS. 9A, 9B and 9C are views showing still another aspect of the diffractive optical element in the first embodiment of the present invention.

FIGS. 9A, 9B, and 9C show another aspect of this embodiment. FIG. 9A schematically shows an element, and a diffraction surface 114 having ring-shaped gratings is formed. FIG. 9B shows the crosssection of principal part of the element, which has two different heights drg and db, as shown in FIG. 9B. The heights drg and db corresponding to R-G and B portions are respectively 1.1 $\mu$m and 0.86 $\mu$m, and the gratings use the same material as in the first embodiment. The arrangement of other portions are the same as those in FIGS. 4A and 4B, and a description thereof will be omitted.

FIG. 9C shows the diffraction efficiencies of another aspect of this embodiment, and is divided into a portion of height db corresponding to a blue (B) portion, and a portion of height drg commonly corresponding to two colors, red and green.

The maximum diffraction efficiency of the blue portion is set within the range from 430 nm to 490 nm, and the maximum diffraction efficiency of the green and red portion is set within the range from 550 nm to 610 nm. With this arrangement, the element suffers less diffraction efficiency drop although the red diffraction efficiency drops slightly, and the shape of the diffractive optical element can be simple. This arrangement can also reduce flare.

In this embodiment, the diffraction efficiency characteristics are set in units of regions of the diffractive optical element by changing the height of the diffractive optical element. However, the present invention is not limited to such specific arrangement, and the diffraction efficiency characteristics may be set using materials having different refractive indices. As described in this embodiment, the same effect may be obtained by gradually changing the grating heights in place of clearly dividing regions.

In this embodiment, the diffractive optical element is set to maximize the diffraction efficiency of the first-order light, and the first-order light is used. Alternatively, the second-order or higher light rays may be used, as will be described later.

Figure 10:
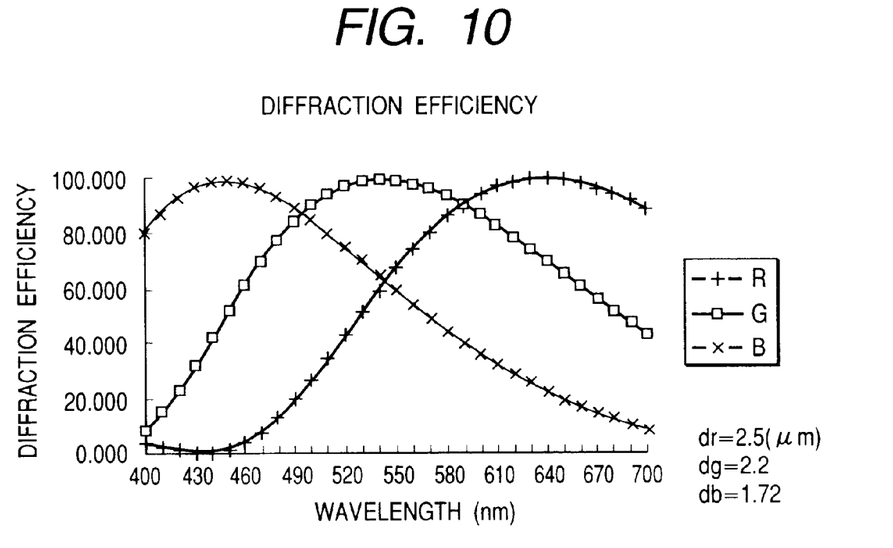
FIG. 10 is a graph showing the diffraction efficiencies of another aspect of the diffractive optical element in the first embodiment of the present invention.

FIG. 10 shows the diffraction efficiency characteristics of the diffractive optical element when the heights are nearly doubled to maximize the diffraction efficiency of second-order light in the same arrangement as that of the diffractive optical element shown in FIGS. 5A and 5B. As shown in FIG. 10, heights dr, dg, and db corresponding to R, G, and B portions are respectively, 2.5 $\mu$m, 2.2 $\mu$m, and 1.72 $\mu$m, and the material is the same as that of the first embodiment. When diffracted light rays of higher than the first order are used, the same effect can be obtained although the wavelength dependence of the diffraction efficiency characteristics becomes larger than that of the first-order light. Furthermore, the diffraction efficiencies corresponding to the angle of incidence=0° are shown. However, it is more effective to design the element in consideration of practical angles of incidence other than 0° in the optical system.

The color separation optical system comprises dichroic mirrors. However, the present invention is not limited to such specific arrangement. For example, diffractive optical elements for color separation such as a diffraction grating, hologram, and the like may be used, and the type of element is not particularly limited. The pixel layout and the like are not particularly limited, since the same effect can be obtained as long as the layout of R, G, and B pixels correspond to the diffraction efficiency characteristics of the diffractive optical element disposed near the aperture stop.

(Second Embodiment)

Figure 11A:
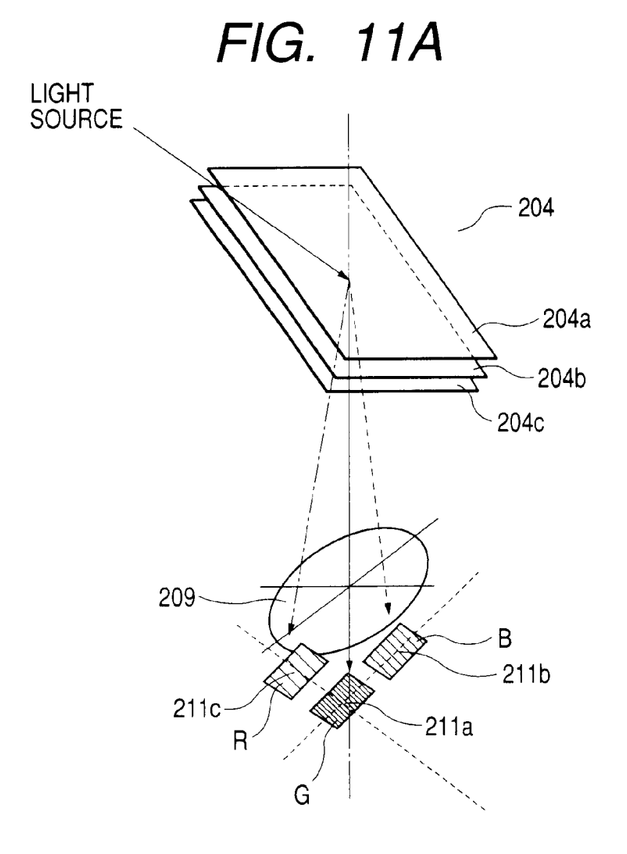
FIG. 11A is a schematic view of an optical system according to the second embodiment of the present invention.
Figure 11B:
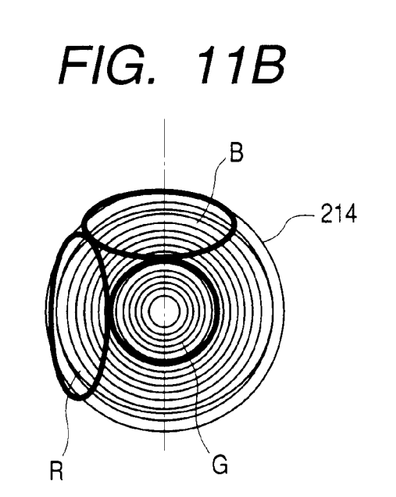
FIG. 11B is a schematic view of a diffractive optical element in the second embodiment of the present invention.

FIGS. 11A and 11B show the second embodiment of the present invention. FIGS. 11A and 11B show principal part of this embodiment. Since this embodiment is directed to a projection optical system as in the first embodiment, the same optical system is used, and a detailed description thereof will be omitted.

FIG. 11A shows the correspondence among a color separation optical system 204, which corresponds to the color separation optical system 104 of the first embodiment, focusing means 209, and pixels 211.

In the first embodiment, light is separated in the plane in which the optical path after the color separation optical system is present, but in this embodiment light is separated two-dimensionally, as shown in FIG. 11A.

FIG. 11B schematically shows a diffractive optical element of this embodiment, which is disposed near an aperture stop (not shown) of a projection optical system as in the first embodiment.

R, G, and B pixels of the pixels shown in FIG. 11A correspond to regions of the diffractive optical element, as shown in FIG. 11B, and these R, G, and B regions are set to respectively have high diffraction efficiency characteristics as in the first embodiment. With this arrangement, generation of flare light can be reduced, and the same effect can be obtained in terms of diffraction efficiency characteristics by changing either the grating height or material characteristics as in the first embodiment.

Figure 12:
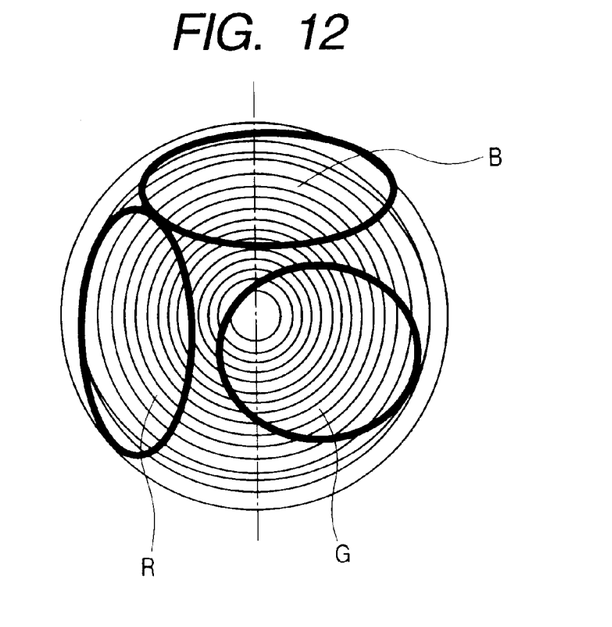
FIG. 12 is a view showing another aspect of the diffractive optical element in the second embodiment of the present invention.

As for region setups, the same effect can be obtained as long as the layout of pixels corresponding to respective colors corresponds to the characteristics of the diffractive optical element disposed near the pupil position. For example, region setups shown in FIG. 12 are available, and setting positions are not particularly limited. In the above embodiments, the diffractive optical element is disposed near the aperture stop of the projection optical system. Alternatively, the diffractive optical element can be equivalently placed near the position of a pupil (or entrance pupil) defined as a virtual or real image of the stop formed by the projection optical system, and such arrangement is included in the scope of the present invention.

In the above embodiments, the diffractive optical elements has ring-shaped gratings which are symmetrical about the axis of rotation. However, the present invention is not limited to this, and the same effect can be obtained as long as the color separation system, the layout of pixels in units of colors, and the diffraction efficiency regions of the diffractive optical element disposed near the aperture stop correspond to one another.

As described above, according to the present invention, an optical system which has a diffractive optical element that can suppress generation of flare or the like due to light rays of unnecessary orders of diffraction caused by the wavelength dependence of the diffractive optical element without using any complicated arrangement, and can be used in a broad wavelength region can be realized.

What is claimed is:

1. A projection display apparatus comprising:

an image display element having a plurality of pixels;

an illumination system for illuminating said image display element with light from a light source, said illumination system including a color separation optical system for separating light from the light source into a plurality of color light rays each having a predetermined wavelength region, the plurality of color light rays being respectively incident on the pixels corresponding to the predetermined wavelength regions, at different angles from one another; and a projection optical system having an aperture stop and for projecting an image displayed by said image display element, wherein said projection optical system includes a diffractive optical element disposed at a position of or near the aperture stop, and a diffraction efficiency of said diffractive optical element is optimized in each of the predetermined wavelength regions.

2. An apparatus according to claim 1, wherein said diffractive optical element has different heights in correspondence with the predetermined wavelength regions.

3. An apparatus according to claim 1, wherein said diffractive optical element has a grating, the height of which changes continuously across regions corresponding to the plurality of color rays each having the predetermined wavelength region.

4. An apparatus according to claim 1, wherein said diffractive optical element is formed of materials having different refractive indices in each of the predetermined wavelength regions.

5. An apparatus according to claim 2, wherein the height of said diffractive optical element changes continuously across regions corresponding to the plurality of color rays each having the predetermined wavelength region.

6. An apparatus according to claim 1, wherein said diffractive optical element has a region which can commonly optimize a diffraction efficiency for at least two of the predetermined wavelength regions.

7. An apparatus according to claim 1, wherein said diffractive optical element is formed by combining at least two of an arrangement having a grating which has different heights in correspondence with the predetermined wavelength regions, an arrangement having a grating height of which changes continuously across regions corresponding to the plurality of color rays each having the predetermine wavelength region, and the arrangement formed using materials of different refractive indices in each of the predetermined wavelength regions.

8. An apparatus according to claim 1, wherein when $\lambda 1$ and $\lambda 2$ represent maximum and maximum wavelengths of the optimized wavelengths in the predetermined wavelength region, a difference between $\lambda 1$ and $\lambda 2$ is not less than 50 nm.

* * * * *